Oct. 3, 1967   J. P. SHEAHAN   3,345,246
LEVELING BASE SHEET FOR REROOFING
Filed July 13, 1964
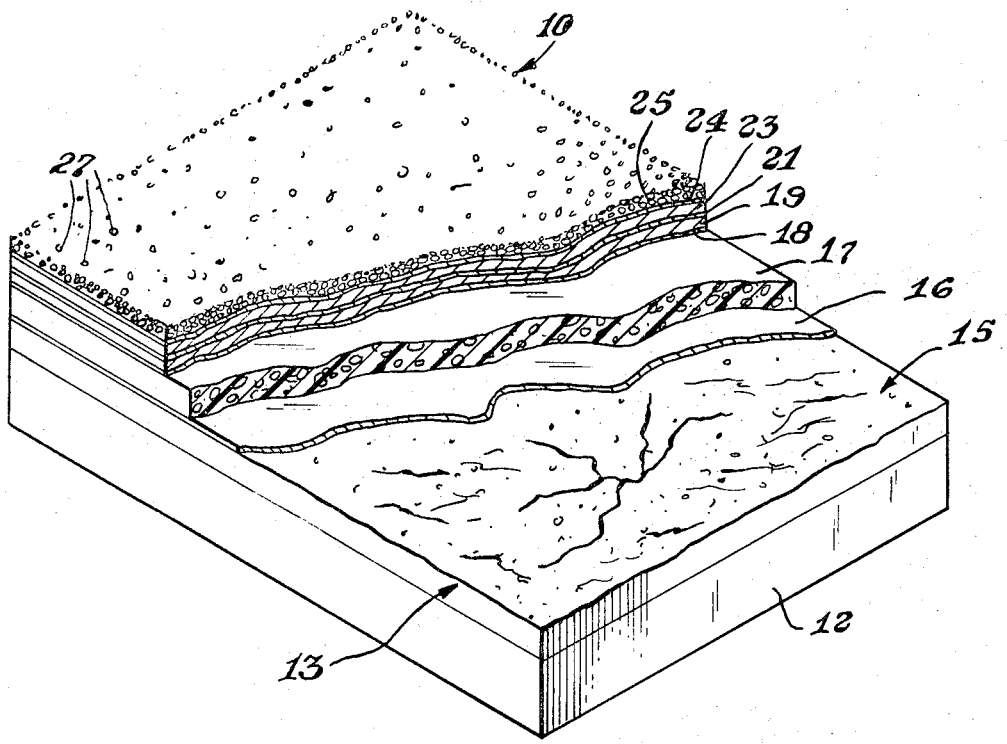
INVENTOR.
James P. Sheahan
BY
   AGENT
   ATTORNEY

United States Patent Office

3,345,246
Patented Oct. 3, 1967

3,345,246
LEVELING BASE SHEET FOR REROOFING
James P. Sheahan, Midland, Mich., assignor to The Dow Chemical Company, Midland, Mich., a corporation of Delaware
Filed July 13, 1964, Ser. No. 382,056
5 Claims. (Cl. 161—161)

Many structures utilize a roof which is built up from a number of layers of bituminous or asphaltic material and felt which is subsequently coated with a layer of bitumen and gravel. Such roofs oftentimes have a useful life of about 15 to 30 years. At the end of such a period, failure often occurs by loss of volatiles from the asphaltic or bituminous material, resulting in shrinkage and cracking. Generally it is impractical to remove the defective layers of gravel, bituminous material and felt. Therefore, in order to repair such a roof, generally a second builtup layer is formed thereover. The gravel surface presented by the old roof is usually covered with a fibrous material prior to the application of felt and bituminous materials. However, sharp discontinuities in the surface of an old roof often give rise to undesired stresses on a freshly laid new roof or reroofing. Projections such as sharp stones and the like in time cause thinning of the new roofing and oftentimes cause premature failure thereof well before the reasonable life expectancy of the roof. Generally in reroofing a builtup roof, sheets of rigid insulating material such as fiberboard or fibrous glass are employed as an overlay on the original roofing prior to the addition of the new roofing. Oftentimes due to thermal expansion and contraction and irregularities in the original roof, such sheets often show irregularities adjacent the matching edges which are potential points of failure and frequently roofs fail at these locations many years short of their reasonable life expectancy.

It is an object of this invention to provide an improved method for reroofing.

A further object of the invention is to provide an improved builtup roof overlaid on an existing builtup roof.

A further object of the invention is to provide an improved method for reroofing which has a life expectancy generally commensurate with a new roof.

These benefits and other advantages in accordance with the present invention are achieved in a method of applying roofing to an existing roof comprising applying and adhering to the surface of the existing roof a layer of an expanded cellular thermoplastic resinous polymer having a thickness of from about ¼ to 1 inch and a heat distortion temperature of at least about 185° Fahrenheit, a compressive strength of from about 5 to about 15 pounds per square inch and a flexural strength of from about 15 to about 35 pounds per square inch applying to the surface of the expanded cellular sheet remote from the existing roof, a roofing felt having a bituminous heat activatable adhesive on at least one surface thereof so as to place an adhesive surface of the felt adjacent the thermoplastic resinous sheet, applying to the roofing felt a hot bituminous adhesive having a temperature sufficiently high to activate the heat activatable adhesive and cause the felt to adhere to the expanded sheet and subsequently applying to the felt desired roofing layers.

Also contemplated within the scope of the invention is an improved roofing structure which comprises a roof of unserviceable nature having an irregular surface, a layer of an expanded cellular thermoplastic resinous polymer having a thickness of from about ¼ to 1 inch and a heat distortion temperature of at least about 185° Fahrenheit, a compressive strength of from about 5 to about 15 pounds per square inch and a flexural strength of from about 15 to about 35 pounds per square inch, an adhesive layer securing the cellular layer to the irregular surface of the roof and a plurality of layers of a roofing felt adhered together with the bituminous material adhered to the surface of the expanded sheet remote from the roof.

Further features and advantages of the present invention will become more apparent when the following specification is taken in connection with the drawing wherein:

The figure depicts the structure of a roof prepared in accordance with the present invention.

The figure illustrates a roof structure generally designated by the reference numeral 10. The roof structure 10 comprises a roof deck 12 having on the surface thereof a generally unserviceable roofing layer 13. The roofing layer 13 remote from the deck 12 has a weather layer 15 comprising a plurality of pebbles adhered to the roofing layer 13 by means of a bituminous material. On the layer 15 is disposed a bituminous adhesive layer 16. A foam plastic layer 17 is adhered to the unserviceable roofing layer by means of the adhesive 16. An adhesive layer 18 is disposed immediately adjacent the surface of the foam plastic layer 17 remote from the unserviceable roofing layer 13. A layer of felt 19 is adhered to the adhesive 18 upon the surface of the felt 19. Remote from the adhesive layer 18 is a bituminous adhesive layer 21. Adhered to the felt layer 19 by means of the adhesive 21 is a felt layer 23 which has on its surface remote from the adhesive layer 21 an adhesive layer 24 within which is embedded a weather resistant surface layer 25 comprising a plurality of pebbles 27.

A new composite roof is readily installed over an existing unserviceable roof by first adhering the foam plastic sheet such as the sheet 17 to the unserviceable roof by means of a bituminous or other suitable adhesive. Advantageously a felt layer or coated sheet having a heat activatable coating thereon is placed adjacent the surface of the foam sheet which is remote from the old roof and a hot bituminous adhesive is applied to the side of the felt layer remote from the foam sheet in a quantity and at a temperature sufficient to cause the heat activatable adhesive such as a steep asphalt to adhere to the plastic foam and yet not reach a temperature sufficiently high to destroy a significant portion of its cell structure. Due to the ability of the foam plastic material to conform to the irregularities of the old or unserviceable roof, a relatively smooth coating is obtained as any projections on the unserviceable roof tend to penetrate into the foam layer and distribute the load in a more or less uniform manner. Additional layers of roofing material are then added as required for the particular roofing application. A particularly advantageous embodiment of the present invention utilizes a thermoplastic resinous sheet prepared from a copolymer of styrene and acrylonitrile wherein the copolymer comprises from about 67 to about 76 percent by weight of styrene copolymerized with about 24 to about 33 percent by weight of acrylonitrile, the resultant polymer being formed into a sheet consisting of fine individually closed cells having diameters of from about 0.001 to about 0.5 millimeter and having an apparent density of from about .75 to about 3 pounds per cubic foot. Such foamed sheet is prepared by methods well known in the art and beneficially has a heat distortion temperature of at least 185° Fahrenheit, a compressive strength of from about 5 to to about 15 pounds per square inch and a flexural strength of from about 20 to about 30 pounds per square inch. Such sheet provides the optimum characteristics for conforming to an unserviceable roof having irregularities, provides adequate heat distortion temperature which allows a roof to be installed which will not slowly collapse in hot weather and permits the use of a base sheet layer which can be provided in the form of rolls rather than boards or slabs. Beneficially the sheet should have a thickness of from about ¼ to about 1 inch depending on the particular configuration of the unserviceable roof being prepared. If a coarse gravel has been used on the original roof, generally the thicker sheet is required. If coarse sand or fine pebbles have been employed, the thinner sheet is genrally preferred unless the insulating value of the heavier sheet is rquired. Large cracks and severe discontinuities in the roof such as, for example, a vertical displacement of about ½ inch appearing between the edges of the original roof deck optionally may receive a second layer of foam prior to applying a continuous layer of the foam thereby providing substantially uniform support for the new roof surface. However, such additional underlayment is rarely necessary, as such severe deviations are usually not encountered. Buildings are successfully reroofed in the described manner of the foregoing specification to provide reliable long lasting weather resistant installations over defective roofs with a minimum expenditure of labor and generally a defect-free roof is obtained which has a life expectancy greater than or equal to that of a roof applied to a new roof deck.

By way of further illustration, a flat gravel-covered built-up roof, about 10 years old and exhibiting a plurality of cracks in the bituminous top coat, was coated with a layer of a steep asphalt having a softening point (ring and ball) of about 180° Fahrenheit and while the asphalt is molten, a ⅜ inch thick foamed sheet of a copolymer of 73 parts styrene and 22 parts of acrylonitrile is adhered to the roof. The copolymer sheet had a bulk density of about 2 pounds per cubic foot and consisted of fine individually closed cells having diameters of from about 0.1 to about .5 millimeter, a compressive strength of about 12 pounds per square inch and a flexural strength of about 25 pounds per square inch. A layer of asphalt is applied to the upper surface of the foam and a 15 pound roofing felt adhered thereto. Four additional layers of felt and bituminous adhesive material were applied and the upper surface covered with gravel passing about a ¾ inch mesh screen. The resultant reroofing appears smooth and uniform and no indication is found of discontinuities existing in the original or old roof.

Similar beneficial and advantageous results are achieved when foamed copolymer sheets of from about 67 to 76 percent by weight of styrene copolymerized with about 24 to 33 percent by weight of acrylonitrile are employed having an apparent or bulky density of from about .75 to about 3 pounds per cubic foot and having a heat distortion temperature of at least 185° Fahrenheit, a compressive strength of from about 5 to about 15 pounds per square inch and a flexural strength from about 15 to about 35 pounds per square inch.

As is apparent from the foregoing specification, the method and manufacture of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

I claim:
1. An improved reroofed structure comprising a roof of unserviceable nature having an irregular surface, a layer of expanded cellular thermoplastic resinous polymer of styrene and acrylonitrile having a thickness of about ¼ to 1 inch having a heat distortion temperature of at least about 185° Fahrenheit, a compressive strength of from about 5 to about 15 pounds per square inch and a flexural strength of from about 15 to about 35 pounds per square inch adhered to an external surface of the unserviceable roof and a plurality of layers of a roofing felt adhered together with bituminous material adhered to the surface of the expanded sheet remote from the roof.

2. The roof of claim 1 wherein the expanded sheet has a bulk density of from about .75 to about 3 pounds per cubic foot.

3. The roof of claim 1 wherein the copolymer has polymerized therein from about 67 to about 76 weight percent of styrene and from about 24 to about 33 weight percent of acrylonitrile.

4. The roof of claim 1 wherein the flexural strength of the foamed sheet is from about 20 to about 30 pounds per square inch.

5. The roof of claim 1 wherein the adhesive is bitumen.

References Cited
UNITED STATES PATENTS

| | | | |
|---|---|---|---|
| 1,606,496 | 11/1926 | Beckwith et al. | 52—615 |
| 3,029,172 | 4/1962 | Glass | 52—309 |
| 3,094,447 | 6/1963 | Chamberlain | 52—309 |

FRANK L. ABBOTT, *Primary Examiner.*

RICHARD W. COOKE, JR., *Examiner.*

J. L. RIDGILL, *Assistant Examiner.*